United States Patent
Lyons et al.

(10) Patent No.: US 7,481,606 B2
(45) Date of Patent: Jan. 27, 2009

(54) SYSTEM, METHOD, AND APPARATUS FOR AIR-PROPELLED CONVEYANCE OF WORKPIECES IN SANITARY ENVIRONMENTS

(76) Inventors: Freddy Robert Lyons, 1419 Hickory Ct., Roanoke, TX (US) 76262; William Brent Dyess, 6607 Rosebud Dr., Rowlett, TX (US) 75089

( * ) Notice: Subject to any disclaimer, the term of this patent is extended or adjusted under 35 U.S.C. 154(b) by 260 days.

(21) Appl. No.: 11/522,635

(22) Filed: Sep. 18, 2006

(65) Prior Publication Data

US 2007/0287119 A1 Dec. 13, 2007

Related U.S. Application Data

(60) Provisional application No. 60/812,033, filed on Jun. 8, 2006.

(51) Int. Cl.
*B65G 53/00* (2006.01)
(52) U.S. Cl. .......................... 406/98; 406/88
(58) Field of Classification Search ............ 406/98, 406/88, 93–94, 191, 194
See application file for complete search history.

(56) References Cited

U.S. PATENT DOCUMENTS

| | | | | |
|---|---|---|---|---|
| 2,805,898 A | * | 9/1957 | Willis, Jr. ................. | 406/88 |
| 2,882,097 A | * | 4/1959 | Hamren .................... | 406/88 |
| 3,180,688 A | * | 4/1965 | Futer ........................ | 406/88 |
| 3,210,124 A | | 10/1965 | Niemi et al. | |
| 3,298,491 A | | 1/1967 | Quest et al. | |
| 3,478,667 A | * | 11/1969 | Bourquin ................. | 454/296 |
| 3,684,327 A | | 8/1972 | Hurd | |
| 3,874,740 A | | 4/1975 | Hurd | |
| 3,890,011 A | * | 6/1975 | Futer ........................ | 406/83 |
| 4,078,498 A | | 3/1978 | Futer | |
| 4,284,370 A | * | 8/1981 | Danler et al. ............. | 406/86 |
| 4,561,806 A | | 12/1985 | Lenhart | |
| 4,655,677 A | | 4/1987 | Lenhart | |
| 4,744,702 A | * | 5/1988 | Wiseman et al. .......... | 406/88 |
| 4,773,796 A | | 9/1988 | Strehlow | |
| 4,822,214 A | * | 4/1989 | Aidlin et al. .............. | 406/86 |
| 4,848,974 A | | 7/1989 | Wayt | |
| 5,129,765 A | * | 7/1992 | Smith et al. .............. | 406/86 |

(Continued)

FOREIGN PATENT DOCUMENTS

JP 2002018222 A 1/2002

OTHER PUBLICATIONS

Kraft Foods Sanitary Accepted Practice No. 106, Supplying Air Under Pressure in Contact with Dairy and Non-Dairy Products and Product Contact Surfaces, Dec. 21, 2001.

(Continued)

*Primary Examiner*—Gene Crawford
*Assistant Examiner*—William R Harp
(74) *Attorney, Agent, or Firm*—Bracewell & Giuliani LLP

(57) ABSTRACT

An air conveyor for handling workpieces in a food grade environment has a cylindrical pipe with an elongated slot that extends along an axial length of the pipe. A track is snap fit in the elongated slot and has a base for supporting the workpieces. The base has air vents that provide directional airflow for pushing the workpieces along an axial length of the track on a cushion of air. A movable hanger assembly supports the pipe from above and captures the workpieces in the track.

16 Claims, 6 Drawing Sheets

U.S. PATENT DOCUMENTS

| | | | |
|---|---|---|---|
| 5,174,320 A * | 12/1992 | Allen | 137/1 |
| 5,209,387 A | 5/1993 | Long et al. | |
| 5,299,890 A | 4/1994 | Spatafora et al. | |
| 5,503,505 A * | 4/1996 | Vejchoda | 406/88 |
| 5,542,789 A * | 8/1996 | Aidlin et al. | 406/88 |
| 5,611,648 A * | 3/1997 | Lenhart | 406/88 |
| 5,628,588 A * | 5/1997 | Ouellette | 406/88 |
| 5,676,239 A * | 10/1997 | Mason | 198/836.1 |
| 6,024,518 A * | 2/2000 | Ouellette | 406/88 |
| 6,190,094 B1 * | 2/2001 | Rediess et al. | 406/19 |
| 6,293,736 B1 * | 9/2001 | Farquhar | 406/87 |
| 6,390,737 B2 * | 5/2002 | Farquhar | 406/195 |
| 6,488,449 B1 * | 12/2002 | Laquay et al. | 406/88 |
| 6,494,646 B1 * | 12/2002 | Sala | 406/88 |
| 6,890,128 B2 * | 5/2005 | Seidl et al. | 406/88 |
| 2002/0064431 A1 | 5/2002 | Langenbeck | |
| 2004/0194840 A1 * | 10/2004 | Swingley | 138/155 |
| 2006/0038397 A1 | 2/2006 | Barrera | |

OTHER PUBLICATIONS

Don't blow your profits! Clean up on Sanitation, http://ww.arrowflowconveyors.com/about.html1.html, Nov. 2004.

* cited by examiner

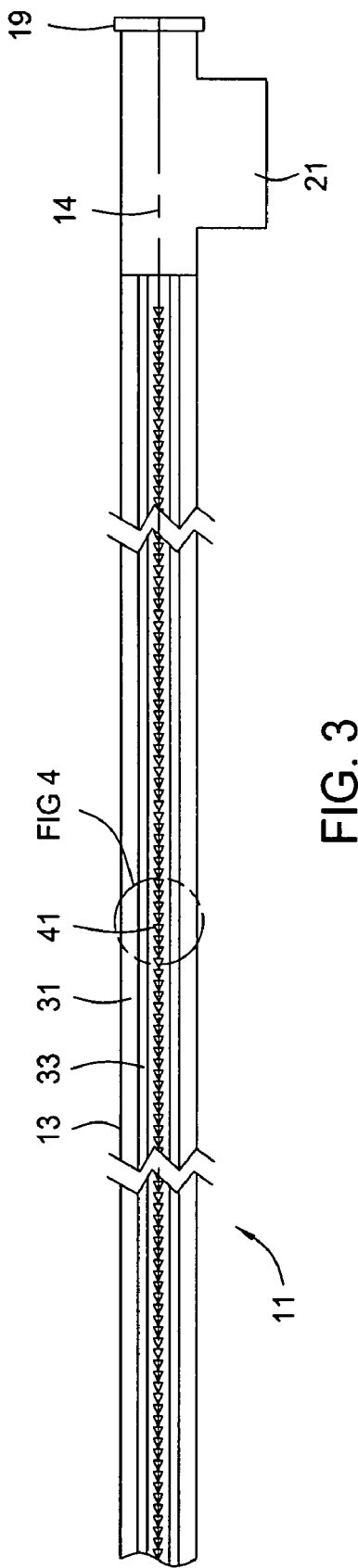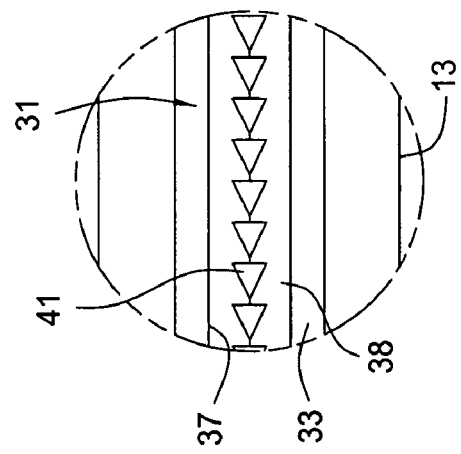

SYSTEM, METHOD, AND APPARATUS FOR AIR-PROPELLED CONVEYANCE OF WORKPIECES IN SANITARY ENVIRONMENTS

The present application claims priority to U.S. Provisional Patent Application No. 60/812,033, filed on Jun. 8, 2006, entitled System, Method, and Apparatus for Air-Propelled Conveyance of Workpieces in Sanitary Environments, and is incorporated herein by reference.

BACKGROUND OF THE INVENTION

1. Technical Field

The present invention relates in general to conveying workpieces with an air stream and, in particular, to an improved system, method, and apparatus for handling workpieces in a food grade environment with an air-propelled conveyor.

2. Description of the Related Art

In the prior art, equipment for handling workpieces, such as bottle caps, in a food grade environment typically comprises rectangular channels for distributing air to convey the workpieces. The channels are usually formed from stainless steel and inherently comprise numerous locations in which different forms of potential contamination (e.g., bacteria) may collect and settle, such as hinges, nested spots, and pit-like locations. In addition, the equipment is required to withstand many frequent cleaning operations over its life span, such as exposure to high temperatures, harsh cleaning agents (e.g., chemical caustic baths), etc., which can corrode the stainless steel material used to form the equipment. Moreover, it is time consuming to disassemble prior art designs for such cleaning operations because of the numerous parts and fasteners. Furthermore, any workpiece disruptions in the conveyor line during operation are difficult to access to correct the disruptions. Thus, an improved system for handling workpieces in a food grade environment with an air-propelled conveyor would be desirable.

SUMMARY OF THE INVENTION

One embodiment of a system, method, and apparatus for handling workpieces in a food grade environment with an air-propelled conveyor comprises a pipe having a longitudinal axis, an interior, a cylindrical inner surface, and a slot formed in a portion of the pipe that defines an elongated slot that extends along an axial length of the pipe. An air blower is coupled to the pipe for providing airflow through the interior of the pipe. A track is mounted in the elongated slot of the pipe. The track has a base extending along the longitudinal axis for supporting the workpieces. The base has numerous air vents for providing pneumatic access from the interior of the pipe to the interior or the track. The vents provide directional airflow for pushing the workpieces along an axial length of the track on a cushion of air. A hanger assembly supports the pipe from above and includes equipment that captures and defines a path for the workpieces along the track.

The track may be formed from stainless steel and is generally U-shaped. The track is press-fit and snapped into the elongated slot of the pipe such that no fasteners are required to secure the track to the pipe. The track also extends for substantially an entire axial length of the elongated slot and pipe. One embodiment of the track has side walls with opposed flanges that land on upper surfaces of the pipe, outward-extending ribs located below the opposed flanges, and recesses defined between adjacent the opposed flanges and ribs for capturing edges of the elongated slot. This design allows the track to be press-fit and snap into the elongated slot in a resilient, spring-like manner.

One embodiment of the hanger assembly comprises a guide rail having a smooth, flat lower surface that extends along the axial length of the track to prevent excess upward movement of the workpieces as they move along the cushion of air flowing through the track. The workpieces are located in and move through an elongated pocket defined between a lower surface of guide rail, the sidewalls, and the base of the track. The guide rail may be secured in a channel that is mounted to fastener assemblies for supporting the pipe. A cover coaxially extends with the guide rail to define an air chamber when in a sealed position adjacent the track. The cover also is movable to a released position wherein the guide rail is further spaced apart from the base of the track to expose the track for any disruptions, maintenance, cleaning, etc.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 3 is a top view of the air conveyor of FIG. 1 and is constructed in accordance with the present invention;

FIG. 4 is an enlarged top view of a portion of a track on the air conveyor of FIG. 3 and is constructed in accordance with the present invention;

DETAILED DESCRIPTION OF THE INVENTION

Referring to FIGS. 1-8, one embodiment of a system, method, and apparatus for handling workpieces in a food grade environment with an air-propelled conveyor 11 is shown. The invention is modular, such that multiple sections of the conveyor 11 (see single section in FIGS. 1 and 3) may be readily combined, end to end, to meet the requirements of any application. Although the present invention is shown and described in substantially linear sections, it should be readily apparent to those skilled in the art that the conveyor 11 may be reconfigured and adapted to change directions (e.g., vertically, horizontally, etc.) with ease.

Figure 1:
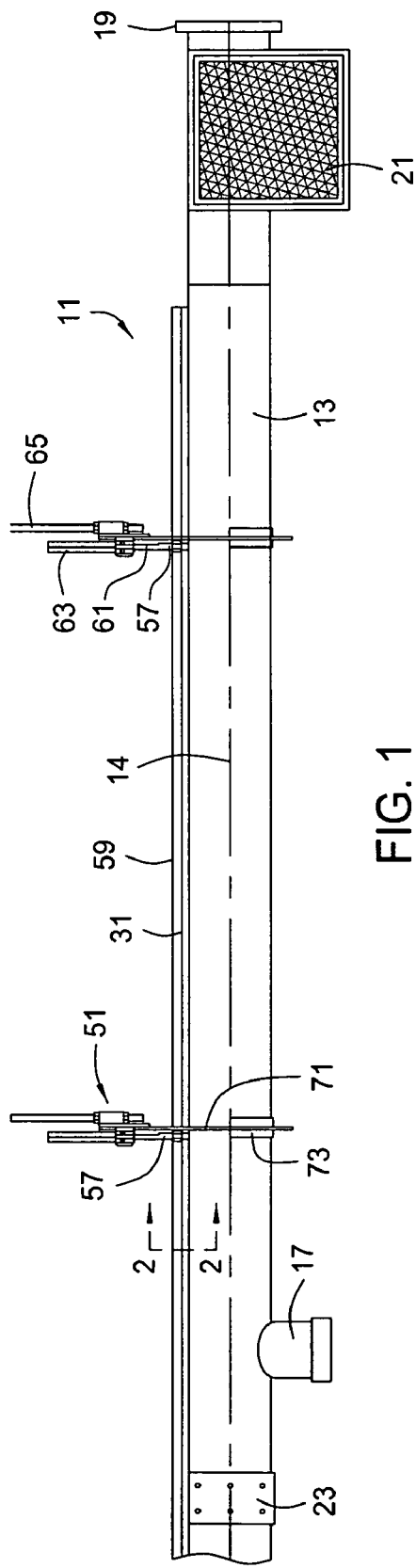
FIG. 1 is a side view of one embodiment of an air conveyor constructed in accordance with the present invention.
Figure 5:
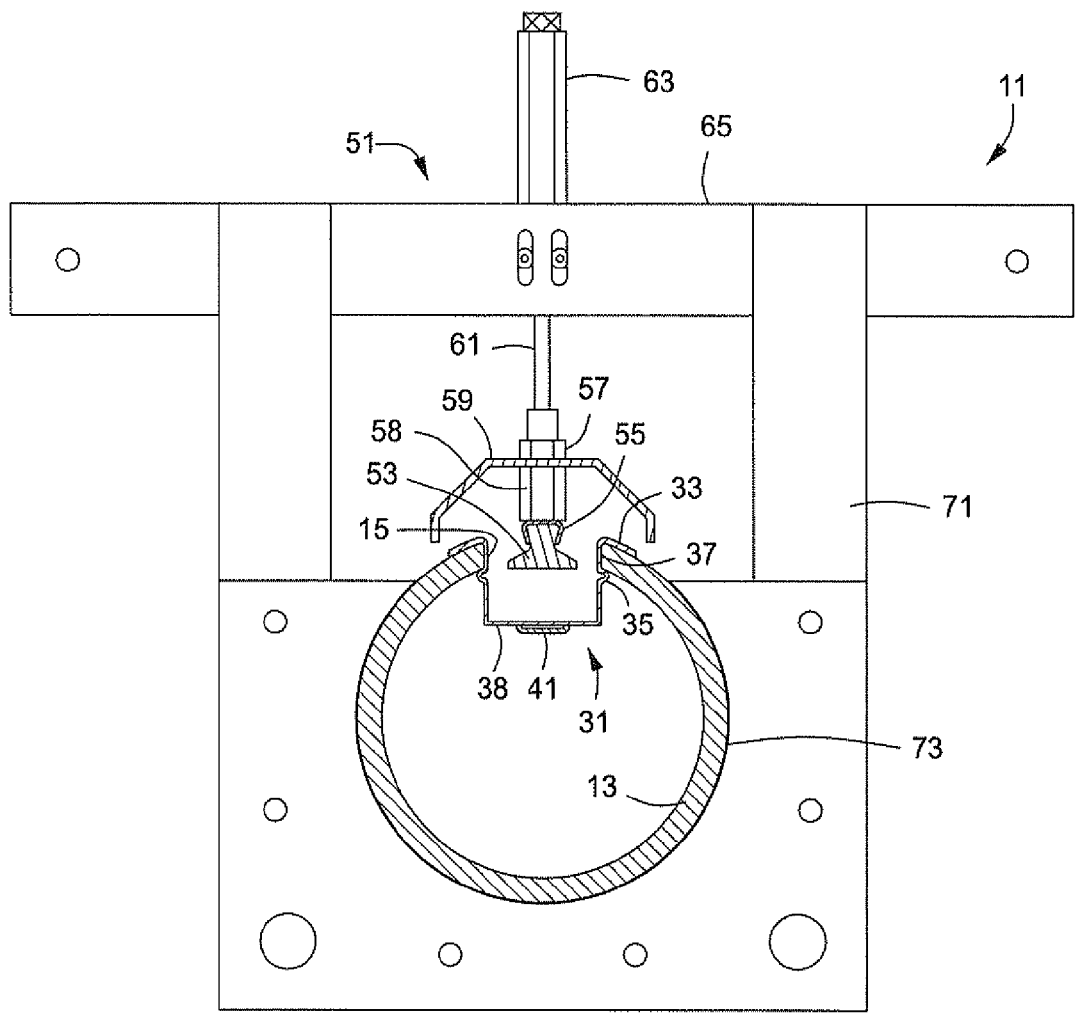
FIG. 5 is a sectional end view of the air conveyor of FIG. 1 and is constructed in accordance with the present invention.

As best shown in FIGS. 1 and 5, one of the base components of conveyor 11 is a cylindrical tube or pipe 13 having a longitudinal axis 14. In one embodiment, pipe 13 comprises a duct formed from schedule-80, CVPC pipe having a six-inch diameter, a ten-foot length, and a smooth, cylindrical inner surface. Pipe 13 may comprise other shapes as well, but one of the objectives of the invention is to reduce and/or minimize the locations in which different forms of potential contamination (e.g., bacteria) may collect, settle, and/or accumulate. Thus, the smooth surfaces of the various components of conveyor 11 facilitate this requirement. The selection of the material that forms pipe 13 is also advantageous in this regard (e.g., CVPC plastic rather than steel), as it is required to withstand many frequent cleaning operations over its life span, such as exposure to high temperatures and harsh cleaning agents (e.g., chlorine, chemical caustic baths, etc.).

An upper arc of the pipe 13 is removed to form an elongated slot 15 (FIGS. 2 and 5) that extends along its entire axial length. In one embodiment, the two axial-length edges formed in the wall of pipe 13 that define slot 15 are parallel to each other, as shown.

Pipe 13 is also provided with a plurality of clean-outs 17, 19 (FIGS. 1 and 3) that help facilitate cleaning operations. Each clean-out 17, 19 is provided with a sealable cap that may be provided without threads for greater cleanliness. Clean-outs 17, or "drain clean-outs," are located opposite slot 15 on the bottom of pipe 13 for draining the contents of pipe 13. In one embodiment, clean-outs 17 may comprise one or more four-inch diameter cylinders that are perpendicular to the longitudinal axis of pipe 13, and which are located about one foot from each axial end of pipe 13. In another embodiment, clean-outs 19, or "axial clean-outs," are provided on one or both axial ends of pipe 13 for readily providing internal axial access to pipe 13.

Figure 8:
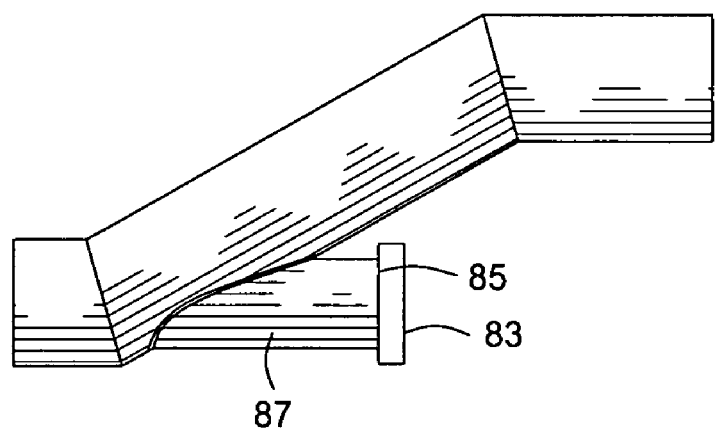
FIG. 8 is a side view of an alternate embodiment of a clean out system for the air conveyor of FIG. 1 and is constructed in accordance with the present invention.

As shown in FIG. 8, the invention also may comprise an alternate embodiment for a clean out and feed discharge fixture 81 on the end of the system (i.e., at clean-out 17 in FIG. 1) for improved cleaning operations. A removable cap 83 may be installed on the end 85 of the schedule 40 pipe 13, including a four-inch nipple 87, sanitary pipe with ferrule, a tri-clamp fitting, swing-out to quick-connect for cleaning equipment, and a shorter length to eliminate threads to improve cleaning operations.

To generate airflow through pipe 13, conveyor 11 is equipped with an air blower 21 that is shown adjacent clean-out 19. The specifications for air blower 21 are highly dependent upon the application but may comprise, for example, a 3.5 hp blower with an air filter. Typically, only one air blower 21 is utilized no matter how many sections of conveyor are required, but again this requirement is application-specific. Blower 21 may be provided with a damper for adjusting the volumetric flow rate of air that is delivers.

For applications requiring more than one section of conveyor 11, joints 23 (see left side of FIG. 1) may be provided for joining or abutting the axial ends thereof. As shown in the exaggerated view of FIG. 7, one embodiment of the invention utilizes slight inclinations or flares 32 at the abutting axial ends of adjacent track sections 31a, 31b. These flares 32 extend the track surface slightly away from workpieces 39a, 39b as they flow through the system, thereby reduce flaking or snagging of the workpieces as they pass through the joints 23.

Referring now to FIGS. 1-5, a conveyor track 31 is mounted in slot 15 of pipe 13. Track 31 may be formed from many different materials, such as plastic or stainless steel. In sectional view (FIGS. 2 and 5), one embodiment of track 31 is generally U-shaped and designed to be press-fit and snapped into slot 15 (i.e., clipped in), such that no fasteners are required to secure it thereto in an interference-like fit. This design also readily permits the removal of track 31 from slot 15 for more thorough and deep cleanings of both pipe 13 and track 31, both of which may be immersed in a cleaning vessel.

In one embodiment, track 31 extends for substantially the entire axial length of slot 15 (and, thus, pipe 13), as do the following features of track 31. Track 31 has a pair of side walls with opposed flanges 33 at its upper end that are designed to land on upper surfaces of pipe 13. A pair of outward-extending ribs 35 is located slightly below respective ones of the flanges 33. A pair of recesses 37 are defined between adjacent ones of the flanges 33 and ribs 35 for capturing the side walls that define slot 15, as shown. In this way, track 31 is press-fit and snaps into slot 15 as track 31 is mounted to pipe 13 in a resilient, spring-like manner. Like pipe 13, all of these features of track 31 are generally smooth or rounded to limit the locations in which bacteria or other potentially harmful matter may collect or settle.

Track 31 also has a base 38 extending between its sidewalls. Base 38 forms an axial, horizontal platform along which large numbers of workpieces 39 (e.g., bottle caps) are supported and conveyed on a cushion of air. A plurality of vectors or air vents 41 is stamped through base 38 to provide pneumatic access to the interior of pipe 13. As best shown in FIG. 4, the vents 41 are configured to provide directional airflow for pushing workpieces 39 along the axial length of the track 31 on the cushion of air. In the embodiment shown, each vent 41 is formed in a triangular pyramidal shape, but other shapes may be used as well depending upon the application.

Referring now to FIGS. 1, 2, 5, and 6, one embodiment of a hanger assembly 51 for the conveyor 11 is shown. The hanger assembly 51 has several functions, including capturing the workpieces 39 in the track 31, and supporting the entire pipe 13 and its assembly from above. The hanger assembly 51 includes a guide rail 53 having, in the embodiment shown, a smooth, flat lower surface that may be formed from plastic (e.g., polyethylene). The lower surface of guide rail 53 extends the entire axial length of track 31 to prevent excess upward movement of the workpieces 39 as they move along the cushion of air generated in and through track 31.

The width of guide rail 53 (see FIG. 2) is broad enough to substantially match the width of the subject workpieces 39. The width of guide rail 39 helps prevent the workpieces 39 from riding up in the spaces between guide rail 53 and the sides of track 31. Thus, the workpieces 39 are located in and move through a "pocket" 54 that is defined between the lower surface of guide rail 53, and the sidewalls and base 38 of track 31. The opposite upper end of guide rail 53 is secured in a channel 55 that is mounted to two or more fastener assemblies 57 (two shown), which may be utilized for about every five feet of axial length of conveyor 11.

In addition, spacers 58 may be used to adjust and compensate for workpieces 39 of differing height. For example, in one embodiment, spacers 58 may comprise a vertical thickness range of about 0.250 to 0.440 for many different cap sizes. Moreover, the different types of spacers 58 may be color-coded to match the various types of caps for ease and control of proper installation, and to provide an immediate visual feedback tool for operators of the invention.

Figure 2:
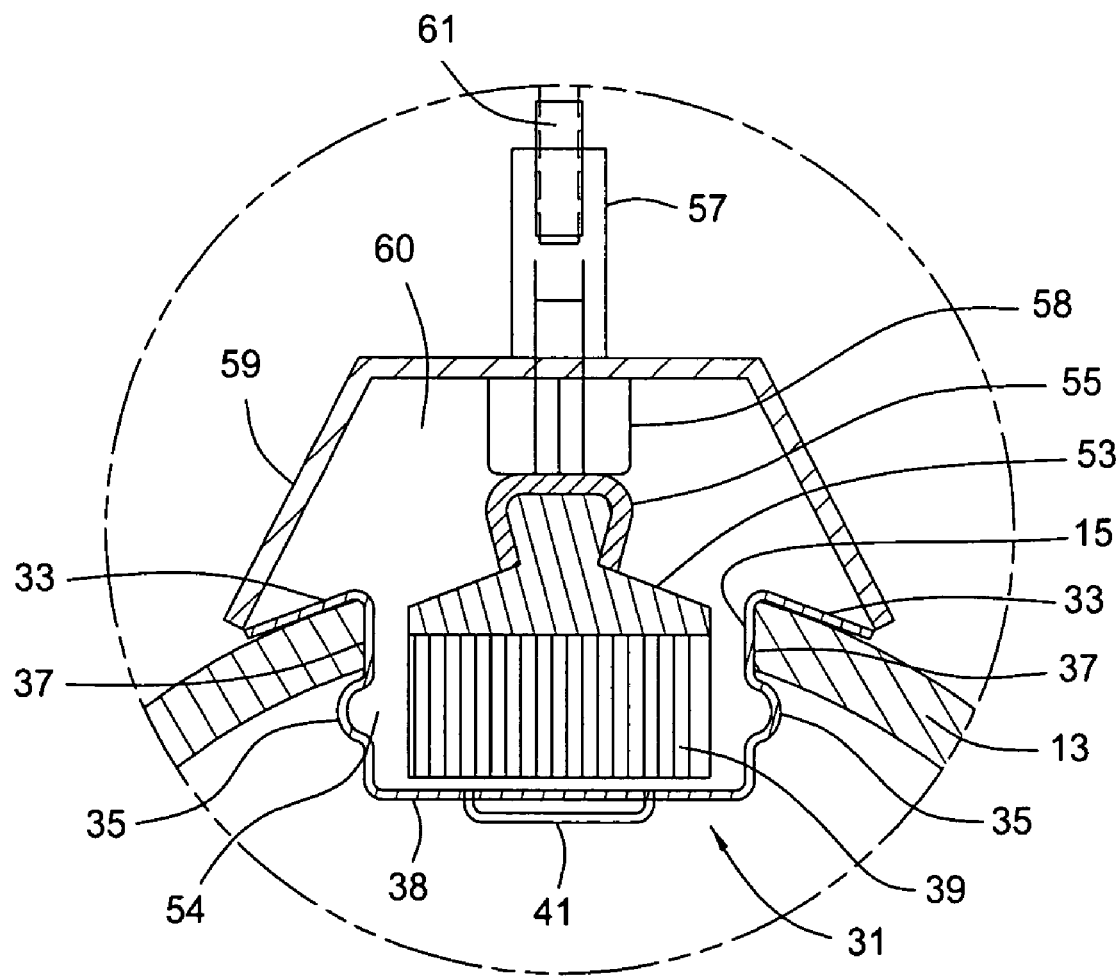
FIG. 2 is a sectional end view of a portion of the air conveyor of FIG. 1 taken along the line 2-2 of FIG. 1 and is constructed in accordance with the present invention.

A cover 59 (such as a clear plastic) coaxially extends with the guide rail 53 to define an air chamber 60 when in a lower or sealed position (FIGS. 2 and 5). Thus, air chamber 60 is located between the lower surfaces of cover 59 and the upper and inner surfaces of track 31. In one embodiment and as shown in the drawings, cover 59 has a lower or closed position wherein it is elevated slightly above track 31 to reduce back pressure in air chamber 60 and to release cap dust.

The cover 59 and guide rail 53 are movable (i.e., raised) via air cylinders 63 to an upper or released position (not shown)

that exposes the entire track 31 simultaneously upon actuation. Each fastener assembly 57 is secured to the lower end of a movable rod 61 (FIG. 5) that extends from a reversing, dual-action air cylinder 63 that brakes on each end. The air cylinders 63 are rigidly mounted to respective flat plates 65 and move the cover 59, via rods 61, between its lower and upper positions.

Figure 6:
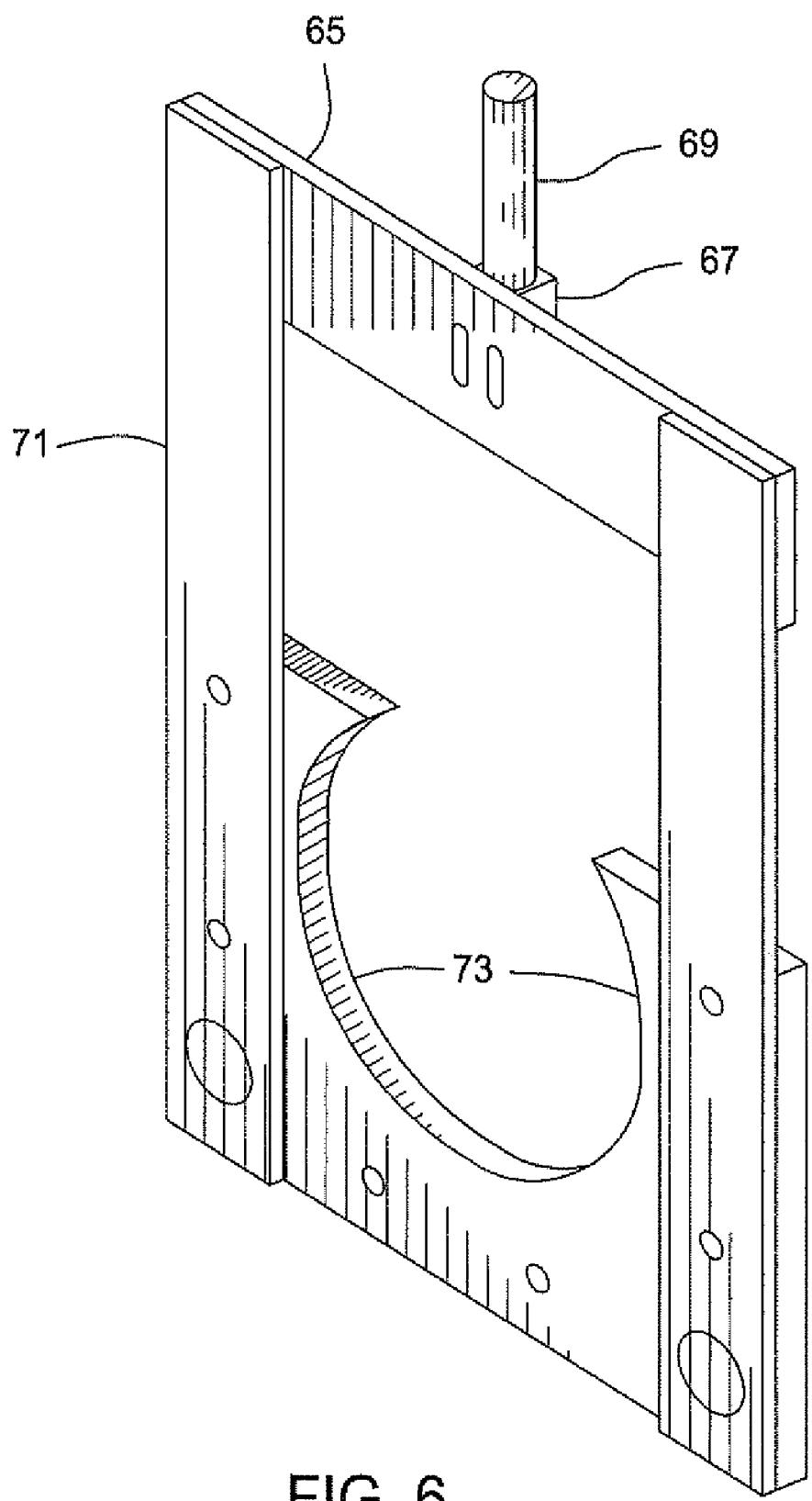
FIG. 6 is an isometric view of a hanger assembly for the air conveyor of FIG. 1 and is constructed in accordance with the present invention.
Figure 7:
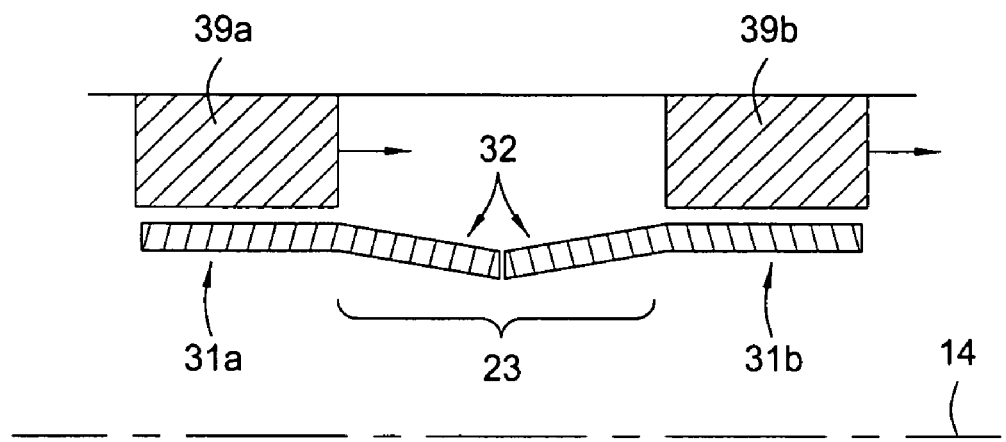
FIG. 7 is a half-sectional side view of one embodiment of the track of FIG. 4 and is constructed in accordance with the present invention.

As shown in FIG. 6, the plates 65 are secured to hold-ups 67, which in turn are suspended from pipe hangers 69 that, for example, may be mounted to a ceiling of the building in which conveyor 11 is located. The hangers 69 and their accompanying support hardware are longitudinally spaced apart at 5-foot increments to reduce sagging of the pipe assembly between adjacent ones of the hangers 69 and thereby improve flow rate of the caps.

A flat, generally U-shaped strap 71 (FIGS. 5 and 6) is suspended from each plate 65. Each strap 71 has at least one perpendicularly-oriented, opposed curved plate 73 in its lower U-shaped portion that generally match a radius of curvature of pipe 13. Pipe 13 may be fastened to curved plate 73 for greater rigidity.

The present invention has several advantages, including the ability to handle workpieces, such as bottle caps, in a sterile or sanitized, food grade environment with an air-propelled conveyor. The smooth features of the various components overcome the need for use of hinges, rectangular corners, nested spots, and pit-like locations commonly employed in prior art designs.

The present invention is readily adapted to be modularly linked in substantially any geometric configuration with minimal locations in which different forms of potential contamination like bacteria may collect and settle. The components of the present invention are easily disassembled (e.g., snap fit between track and pipe), and its materials withstand numerous cleaning operations over its life span, such as exposure to high temperature solutions and/or caustic cleaning agents. Moreover, the clear cover is immediately and simultaneously movable to or removable from the various modules of the track via pneumatic devices.

While the invention has been shown or described in only some of its forms, it should be apparent to those skilled in the art that it is not so limited, but is susceptible to various changes without departing from the scope of the invention.

What is claimed is:

1. An air-propelled conveyor system for handling workpieces in a food grade environment, the system comprising:
   a pipe having a longitudinal axis, an interior, a cylindrical inner surface, a slot formed in an upper portion of the pipe that defines an elongated slot that extends along an axial length and the upper portion of the pipe;
   an air blower coupled to the pipe for providing airflow through the interior of the pipe;
   a track mounted to the upper portion of the pipe in the elongated slot of the pipe, the track having a base on a lower end and sidewalls extending along the longitudinal axis, the base having a plurality of air vents for providing pneumatic access from the interior of the pipe into a pocket of the track, such that the air vents when air flows therethrough provide upward and axial directional airflow for pushing the workpieces upward and along an axial length of the track on a cushion of air;
   a hanger assembly for supporting the pipe from above, and capturing the workpieces in the track, the hanger assembly having a guide rail with a smooth, flat lower surface that extends along the axial length of the track to prevent excess upward movement of the workpieces as the workpieces move along the cushion of air flowing though the track, such that the workpieces are located in and move through the pocket defined between a lower surface of the guide rail and the sidewalls and base of the track; and
   a drain clean out positioned substantially perpendicular to the longitudinal axis of the pipe and located a preselected distance from an axial end of the pipe; and
   an axial clean out positioned on the axial end of the pipe and substantially parallel to the longitudinal axis for providing internal axial access to the pipe.

2. An air-propelled conveyor system according to claim 1, wherein the pipe comprises schedule-80, CPVC cylindrical pipe having a six-inch diameter, a ten-foot length, and the air vents are formed in triangular pyramidal shapes.

3. An air-propelled conveyor system according to claim 1, wherein the elongated slot in the pipe has two axial length edges formed in a wall of the pipe that are parallel to each other, and wherein:
   the drain clean out is formed in the pipe for facilitating cleaning operations, the drain clean out having an unthreaded, sealable cap for removably sealing the drain clean out, and the drain clean out being located opposite the elongated slot on a bottom of the pipe for draining any liquid contents in the pipe.

4. An air-propelled conveyor system according to claim 1, wherein the track is formed from stainless steel, generally U-shaped, press-fit and snapped into the elongated slot at the upper end of the pipe such that no fasteners are required to secure the track to the pipe, and the track extends for substantially an entire axial length of the elongated slot and pipe, and wherein the preselected distance of the position of the drain clean out comprises about one foot.

5. An air-propelled conveyor system according to claim 1, wherein the side walls of the track have opposed flanges that land on upper surfaces of the pipe, outward-extending ribs located below the opposed flanges, and recesses defined between the opposed flanges and ribs for capturing edges of the elongated slot of the pipe, such that the track is press-fit and snaps into the elongated slot in a resilient, spring-like manner.

6. An air-propelled conveyor system according to claim 1, wherein the guide rail is secured in a channel that is mounted to fastener assemblies, and a cover coaxially extends with the guide rail to define an air chamber when in a sealed position adjacent the track to close the pocket, the cover also being movable to a released position wherein the guide rail is further spaced apart from the base of the track to expose the track and open the pocket; and wherein the fastener assemblies are secured to movable rods that extend from reversing, single-acting air cylinders for moving the guide rail and cover between the sealed and released positions.

7. An air-propelled conveyor system according to claim 1, wherein the pipe, track, and hanger assembly comprise a plurality of pipes, tracks, and hanger assemblies that are axially joined, end to end, in substantially linear sections, and which are configured to change directions vertically and horizontally.

8. An air-propelled conveyor system for handling workpieces in a food grade environment, the system comprising:
   a pipe having a longitudinal axis, an interior, a cylindrical inner surface, a slot formed in an upper portion of the pipe that defines an elongated slot that extends along an axial length of the upper portion the pipe;
   an air blower coupled to the pipe for providing airflow though the interior of the pipe;
   a track mounted to the upper portion of the pipe in the elongated slot of the pipe, the track having a base on a lower end and sidewalls extending along the longitudinal axis, and the base having a plurality of air vents for providing pneumatic access from the interior of the pipe into a pocket of the track, such that the air vents when air flows therethrough provide upward and axial directional airflow for pushing the workpieces upward and along an axial length of the track on a cushion of air; and a hanger assembly for supporting the pipe from above, and capturing the workpieces in the track, the hanger assembly having a guide rail with a substantially smooth, flat lower surface that extends along the axial length of the track to prevent excess upward movement of the workpieces as the workpieces move along the cushion of air flowing through the track, such that the workpieces are located in and move through the pocket defined between a lower surface of guide rail and the sidewalls and base of the track.

9. An air-propelled conveyor system according to claim 8, wherein the pipe comprises schedule-80, CPVC cylindrical pipe having a six-inch diameter, a ten-foot length, and the air vents are formed in triangular pyramidal shapes.

10. An air-propelled conveyor system according to claim 8, wherein the elongated slot in the pipe has two axial length edges formed in a wall of the pipe that are parallel to each other, and further comprising:

a clean out formed in the pipe for facilitating cleaning operations, the clean out having an unthreaded, sealable cap for removably sealing the clean out, and the clean out being located opposite the elongated slot on a bottom of the pipe for draining any liquid contents in the pipe.

11. An air-propelled conveyor system according to claim 8, further comprising a clean out comprising a four-inch diameter cylinder that is perpendicular to the longitudinal axis of the pipe, and is located about one foot from an axial end of the pipe; and further comprising at least one axial clean out on the axial end of the pipe and parallel to the longitudinal axis for providing internal axial access to the pipe.

12. An air-propelled conveyor system according to claim 8, wherein the track is formed from stainless steel, generally U-shaped, press-fit and snapped into the elongated slot of the pipe such that no fasteners are required to secure the track to the pipe, and the track extends for substantially an entire axial length of the elongated slot and pipe.

13. An air-propelled conveyor system according to claim 8, wherein the track has side walls with opposed flanges that land on upper surfaces of the pipe, outward-extending ribs located below the opposed flanges, recesses defined between adjacent the opposed flanges and ribs for capturing edges of the elongated slot, such that the track is press-fit and snaps into the elongated slot in a resilient, spring-like manner.

14. An air-propelled conveyor system according to claim 8, wherein the guide rail is secured in a channel that is mounted to fastener assemblies, and a cover coaxially extends with the guide rail to define an air chamber when in a sealed position adjacent the track, the cover also being movable to a released position wherein the guide rail is further spaced apart from the base of the track to expose the track; and wherein the fastener assemblies are secured to movable rods that extend from reversing, single-acting air cylinders for moving the guide rail and cover between the sealed and released positions.

15. An air-propelled conveyor system according to claim 8, wherein the pipe, track, and hanger assembly comprise a plurality of pipes, tracks, and hanger assemblies that are axially joined, end to end, in substantially linear sections, and which are configured to change directions vertically and horizontally.

16. An air-propelled conveyor system for handling workpieces in a food grade environment, the system comprising:

a pipe having a longitudinal axis, an interior, a cylindrical inner surface, a slot formed in a portion of the pipe that defines an elongated slot that extends along an axial length of an upper portion of the pipe, the elongated slot having two axial length edges formed in a wall of the pipe that are parallel to each other, and the pipe comprising schedule-80, CPVC cylindrical pipe having a six-inch diameter, a ten-foot length;

an air blower coupled to the pipe for providing airflow through the interior of the pipe;

a track mounted in the elongated slot of formed in the upper portion of the pipe, the track having a base on a lower end extending along the longitudinal axis, and the base having a plurality of air vents for providing pneumatic access from the interior of the pipe to a pocket formed in the track, such that the air vents when air flows therethrough provide upward and axial directional airflow for pushing the workpieces upward and along an axial length of the track on a cushion of air, the air vents being formed in triangular pyramidal shapes;

the track is formed from stainless steel, generally U-shaped, press-fit and snapped into the elongated slot of the pipe such that no fasteners are required to secure the track to the pipe, the track extends for substantially an entire axial length of the elongated slot and pipe, the track has side walls with opposed flanges that land on upper surfaces of the pipe, outward-extending ribs located below the opposed flanges, recesses defined between adjacent the opposed flanges and ribs for capturing edges of the elongated slot, such that the track is press-fit and snaps into the elongated slot in a resilient, spring-like manner;

a hanger assembly for supporting the pipe from above, and capturing the workpieces in the track, the hanger assembly comprising a guide rail having a smooth, flat lower surface tat extends along the axial length of the track to prevent excess upward movement of the workpieces as the workpieces move along the cushion of air flowing through the track, such that the workpieces are located in and move though the pocket defined between a lower surface of guide rail and the sidewalls and base of the track;

the guide rail being secured in a channel that is mounted to fastener assemblies for supporting the pipe, and a cover coaxially extends with the guide rail to define an air chamber when in a sealed position adjacent the track, the cover also being movable to a released position so that the guide rail is further spaced apart from the base of the track to expose the track;

the fastener assemblies being secured to movable rods that extend from reversing, single-acting air cylinders for moving the guide rail and cover between the sealed and released positions;

a drain clean out formed in the pipe for facilitating cleaning operations, the drain clean out having an unthreaded, scalable cap for removably sealing the drain clean out, and the drain clean out being located opposite the elongated slot on a bottom of the pipe for draining any liquid contents in the pipe, the drain clean out comprising a four-inch diameter cylinder being positioned substantially perpendicular to the longitudinal axis of the pipe, and being located about one foot from an axial end of the pipe; and at least one axial clean out positioned on the axial end of the pipe and substantially parallel to the longitudinal axis for providing internal axial access to the pipe.

* * * * *

UNITED STATES PATENT AND TRADEMARK OFFICE
CERTIFICATE OF CORRECTION

PATENT NO. : 7,481,606 B2  Page 1 of 1
APPLICATION NO. : 11/522635
DATED : January 27, 2009
INVENTOR(S) : Freddy Robert Lyons et al.

It is certified that error appears in the above-identified patent and that said Letters Patent is hereby corrected as shown below:

Col. 8, Ln. 11: delete "of" between --slot-- and --formed--
Col. 8, Ln. 35: replace "tat" with --that--
Col. 8, Ln. 54: replace "scalable" with --sealable--

Signed and Sealed this

Twenty-fourth Day of March, 2009

JOHN DOLL
*Acting Director of the United States Patent and Trademark Office*